United States Patent
Gates et al.

(10) Patent No.: US 7,681,768 B2
(45) Date of Patent: Mar. 23, 2010

(54) CUSHIONED ARTICLE HOLDER

(75) Inventors: George D. Gates, West Jordan, UT (US); Travis D. Gates, West Jordan, UT (US)

(73) Assignee: All Rite Products, Inc., West Jordan, UT (US)

(*) Notice: Subject to any disclaimer, the term of this patent is extended or adjusted under 35 U.S.C. 154(b) by 1079 days.

(21) Appl. No.: 11/342,346

(22) Filed: Jan. 26, 2006

(65) Prior Publication Data

US 2009/0321489 A1 Dec. 31, 2009

Related U.S. Application Data

(60) Provisional application No. 60/647,673, filed on Jan. 26, 2005.

(51) Int. Cl.
*B62J 11/00* (2006.01)
*B60R 11/00* (2006.01)

(52) U.S. Cl. .............. 224/440; 224/401; 224/420; 248/222.12

(58) Field of Classification Search ............ 224/401, 224/420, 440, 567, 913; 211/64, 70.8, 124; 248/222.12, 224.7, 309.1, 912
See application file for complete search history.

(56) References Cited

U.S. PATENT DOCUMENTS

| | | | |
|---|---|---|---|
| 6,397,507 B1 * | 6/2002 | Marshall et al. | 42/72 |
| 6,584,719 B1 * | 7/2003 | Morford | 42/94 |
| 6,637,707 B1 | 10/2003 | Gates et al. | |
| 6,695,183 B2 | 2/2004 | Hancock et al. | |
| 6,793,109 B2 | 9/2004 | Gates et al. | |
| 2004/0113041 A1 | 6/2004 | Hancock et al. | |

* cited by examiner

*Primary Examiner*—Nathan J Newhouse
*Assistant Examiner*—Adam Waggenspack
(74) *Attorney, Agent, or Firm*—Thorpe North & Western LLP

(57) ABSTRACT

A cushioned holder device for holding articles includes an attachment base, configured to be attached to a support structure and a holding member configured to receive and hold an article therein. The holding member is coupled to the attachment base and includes two generally upright arms which collectively define a containment area therebetween. A cushion is associated with the holder at a lower portion of the containment area to provide a cushioned interface between the article and the holder. The cushion includes an upper contact surface and an opposing lower contact surface, with an intermediate riser extending therebetween.

7 Claims, 5 Drawing Sheets

CUSHIONED ARTICLE HOLDER

Priority is claimed to U.S. Provisional Patent Application No. 60/647,673, filed Jan. 26, 2005, which is hereby incorporated herein in its entirety.

FIELD OF THE INVENTION

1. Background

The present invention relates generally to devices suitable for holding a variety of articles. More particularly, the present invention relates to cushioned article holders for use on vehicles.

2. Related Art

Holding devices for use on vehicles have been utilized for many years to allow operators of the vehicles to carry various articles on the vehicle. For example, article holders such as those disclosed in U.S. Pat. No. 4,607,772 (to Hancock) have been used to carry hunting and fishing equipment, tools, etc., on motorcycles, all-terrain vehicles ("ATVs"), and other vehicles. Due to the nature of the terrain on which vehicles equipped with such holders are operated, the holders are subject to often extreme jarring and vibratory forces. While such holding systems have generally been developed and adapted to securely carry a variety of articles in such operating terrain while preventing the articles from becoming dislodged from the vehicle in question, many such systems do not adequately protect the articles from the extreme jarring forces generated during use of the vehicles.

In an effort to both securely carry articles and to protect the articles from damage due to jarring forces, attempts have been made to provide a cushioning interface between the article being held and the holder. Many of these attempts have resulted in an article holder that includes a complex web of straps and air pockets designed to cushion the article and absorb the impact of jarring forces imposed by bouncing and other movement of the vehicle. While such systems have proved at least partially effective, they are often of such complex construction that they cannot withstand the rough handling often encountered in field use and often increase the cost of manufacturing the holder to prohibitive levels.

As an example, conventional cushioning systems used on article holders are generally formed of a relatively soft, pliant material designed to avoid scratching or otherwise damaging equipment carried by the holders. Such pliant material, when formed in intricate cushioning designs, can be easily torn by the repeated removal and installation of tools or firearms in the holder. Also, the intricate designs used in forming "open space" cushions create a cushioning interface that is easily shifted laterally (e.g., backwardly-and-forwardly) within the holder, because the cushioning material is often suspended within, and can swing freely in, the holder. Thus, when rifles or tools are carried on ATVs in such article holders, the rifles or tools can tear or otherwise damage the cushioning interface, and can be subject to a great deal of lateral movement within the holder.

SUMMARY OF THE INVENTION

The present invention provides a cushioned holder device for holding articles, including an attachment base, configured to be attached to a support structure and a holding member configured to receive and hold an article therein. The holding member can be coupled to the attachment base and can include two generally upright arms which collectively define a containment area therebetween. A cushion can be associated with the holder at a lower portion of the containment area to provide a cushioned interface between the article and the holder. The cushion can include an upper contact surface and an opposing lower contact surface, with an intermediate riser bifurcating an area defined therebetween.

In accordance with another aspect of the invention, a cushioned holder device for holding articles is provided, including an attachment base, configured to be attached to a support structure and a holding member configured to receive and hold an article therein. The holding member can be coupled to the attachment base and can include two generally upright arms which collectively define a containment area therebetween. A cushion can be associated with the holder at a lower portion of the containment area to provide a cushioned interface between the article and the holder. The cushion can include an upper contact surface having an indentation formed therein. An opposing lower contact surface can have a protrusion extending therefrom configured to nest within the cavity. The indentation and the protrusion can be operable to provide a secondary cushioning interface to the article holder in the event the upper and lower contact surfaces of the cushion are compressed together.

In accordance with another aspect of the invention, a cushioned holder device for holding articles is provided, including an attachment base, configured to be attached to a support structure and a holding member configured to receive and hold an article therein. The holding member can be coupled to the attachment base and can include two generally upright arms which collectively define a containment area therebetween. A cushion can be associated with the holder at a lower portion of the containment area to provide a cushioned interface between the article and the holder. The cushion can include an upper strap extending inwardly from one of the upright arms toward an opposing upright arm and across a portion of the containment area to another of the upright arms. A lower contact portion can be defined on the upright arms between ends of the upper strap. The upper strap can have a perimeter length greater than or equal to a perimeter length of the lower contact portion.

In accordance with another aspect of the invention, a cushioned holder device for holding articles is provided, including an attachment base, configured to be attached to a support structure and a holding member configured to receive and hold an article therein. The holding member can be coupled to the attachment base and can include two generally upright arms which collectively define a containment area therebetween. A cushion can be associated with the holder at a lower portion of the containment area to provide a cushioned interface between the article and the holder. The cushion can include an upper strap extending inwardly from one of the upright arms toward an opposing upright arm, across a portion of the containment area and to another of the upright arms, and a lower contact portion defined on the upright arms between ends of the upper strap. The upper strap can be operable to deflect toward the lower contact portion without applying a separating force between the upper strap and the upright arms.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1A' is a cross-sectional view of another embodiment of the cushioned holder of FIG. 1A;

DETAILED DESCRIPTION

Before the present invention is disclosed and described, it is to be understood that this invention is not limited to the particular structures, process steps, or materials disclosed herein, but is extended to equivalents thereof as would be recognized by those of ordinarily skilled in the relevant arts. It should also be understood that terminology employed herein is used for the purpose of describing particular embodiments only and is not intended to be limiting.

It must be noted that, as used in this specification and the appended claims, the singular forms "a" and "the" include plural referents, unless the context clearly dictates otherwise. Thus, for example, reference to an "upright arm" includes one or more of such arms.

DEFINITIONS

In describing and claiming the present invention, the following terminology will be used in accordance with the definitions set forth below.

As used herein, the term "auxiliary device" is to be understood to refer to an object that can be mounted to at least a portion of an ATV in order to be transported by the ATV. Examples of auxiliary devices include, without limitation, tools, such as shovels, rakes, picks, etc., guns, bows, camera equipment, scopes, and also intermediate structures, such as tripods, rests, etc., on which such devices can be mounted or rested.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value and should apply regardless of the breadth of the range or the characteristics being described.

INVENTION

Figure 1:
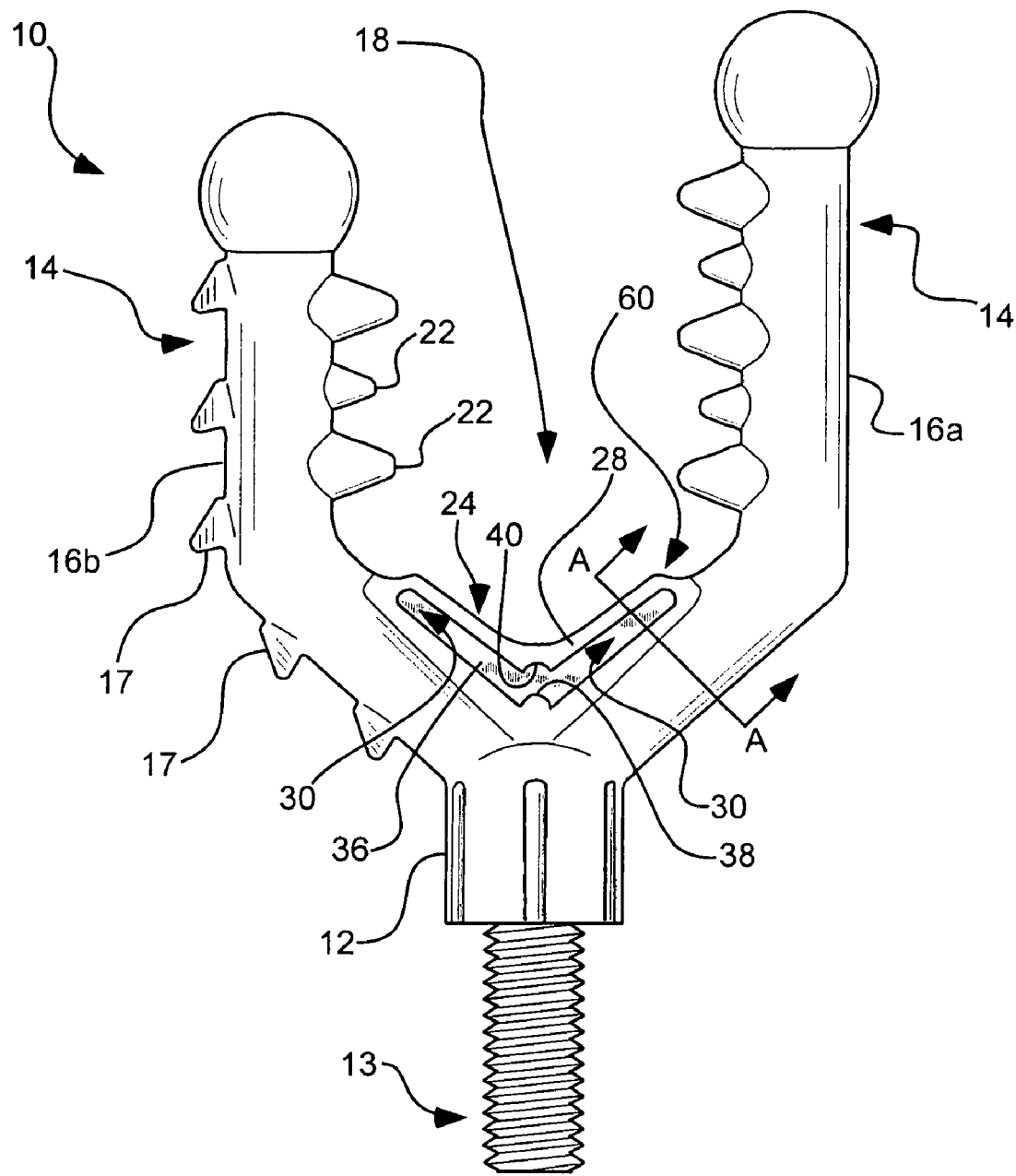
FIG. 1 is a front view of a cushioned article holder in accordance with an embodiment of the present invention.

As illustrated in FIG. 1, a cushioned holder for articles, indicated generally at 10, in provided accordance with an embodiment of the present invention. The holder can include an attachment base 12 configured to be attached to a support structure (not shown) via connecting structure such as threaded stem 13. A generally U-shaped holding member 14 can be coupled to or can be formed integrally with the attachment base. The U-shaped holding member can include two generally upright arms 16a, 16b which can collectively define a containment area 18 therebetween. The upright arms and containment area can be configured to receive and hold an article or object (represented by example at 20 in FIG. 2) therein. A plurality of resilient gripping teeth 22 can also be provided which can project from at least one of the upright arms into the containment area.

The attachment base 12 can include threaded mounting stem 13 which can be fixedly connected to the holder and can be configured to be pivotally connected to a support structure (not shown) associated with a vehicle. In this manner, the holding member may be pivoted about a longitudinal axis of the mounting stem 13 to enable the holder to be i) adjusted in height relative to the support structure, and ii) adjusted in an angular manner relative to the support structure and the article being held to allow the holding device to more securely grip the article. A locking nut (not shown) or other locking means can be configured to lock the holding member in position relative to the support structure to aid in securing the article.

The resilient gripping teeth 22 can be used in cooperation with the adjustability of the holder about the mounting stem. Thus, an object or article can be disposed in the holder and the holder can be "cocked" angularly such the article is contacted on opposing sides by each of the upright arms. The gripping teeth can aid in gripping or engaging the opposing sides of the article when in this cocked position. In addition, a strap (not shown) can extend from a top of arm 16a to one of a plurality of catches 17 disposed on arm 16b to aid in securing the article within the containment area. The gripping teeth can also cooperate with the strap to ensure that the article remains securely cinched within the holder.

The article holder can include a cushion, shown generally at 24, that can be coupled to or formed within the holder at a lower portion of the containment area 18 to provide a cushioned or elastic interface between the article (20 in FIG. 2) and the holder. In one embodiment of the invention, the cushion is centered within the containment area about a location where the two upright arms intersect. In one aspect of the invention, the cushion is symmetrically centered with respected to the upright arms and does not extend to the portions of the upright arms that are substantially vertical. The cushion can be formed from a variety of materials and in one embodiment is formed of a pliant material that can elastically deform in response to a load applied to the cushion.

Figure 1A:
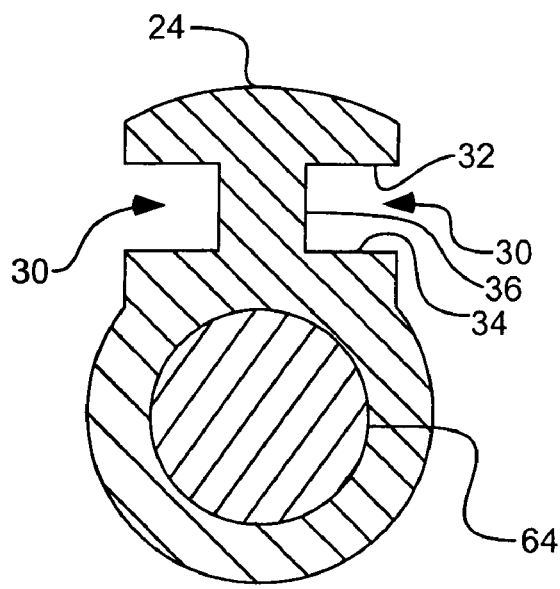
FIG. 1A is a cross-sectional view of the cushioned holder of FIG. 1, taken along section A-A of FIG. 1 (with the vertical portion of the upright arm adjacent to section A-A omitted for clarity)
Figure 1A:
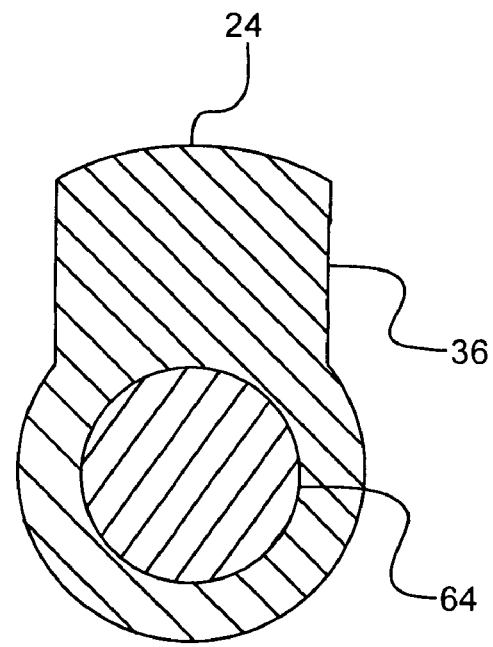

In one aspect of the invention, shown most clearly in cross section in FIG. 1A, the cushion can include a cavity 30 formed therein having an upper 32 and a lower 34 contact surface with an intermediate riser 36 separating the upper and lower contact surfaces. In operation, the upper contact surface can compress toward the lower contact surface in response to a load applied to the cushion by the article resting in the holder. The elastic nature of the material from which the cushion is formed allows the upper contact surface to elastically deform in response to the load applied, which in turn causes movement of the upper contact surface toward the lower contact surface.

To aid in allowing the cushion 24 to elastically absorb loading applied by the article, intermediate riser 36 can be formed from the same, or substantially the same, pliant material of which the remainder of the cushion is formed. The intermediate riser can increase the overall stiffness of the cushion to provide an increased ability to withstanding loading. In the embodiment illustrated schematically in FIG. 1A, the riser can have a thickness on the order of ⅛ inch. However, the thickness of the riser can be easily varied to tailor the overall stiffness of the cushion. In the embodiment shown schematically in FIG. 1A', the thickness of the vertical riser 36 is essentially the same as an overall thickness of the cushion. Thus, in this embodiment, the thickness of the riser has been increased to the point that no cavity is present in the cushion. As the cushion in this embodiment is formed from a pliant material, however, the cushion can still provide an elastic interface between the article and the holder.

Figure 3:
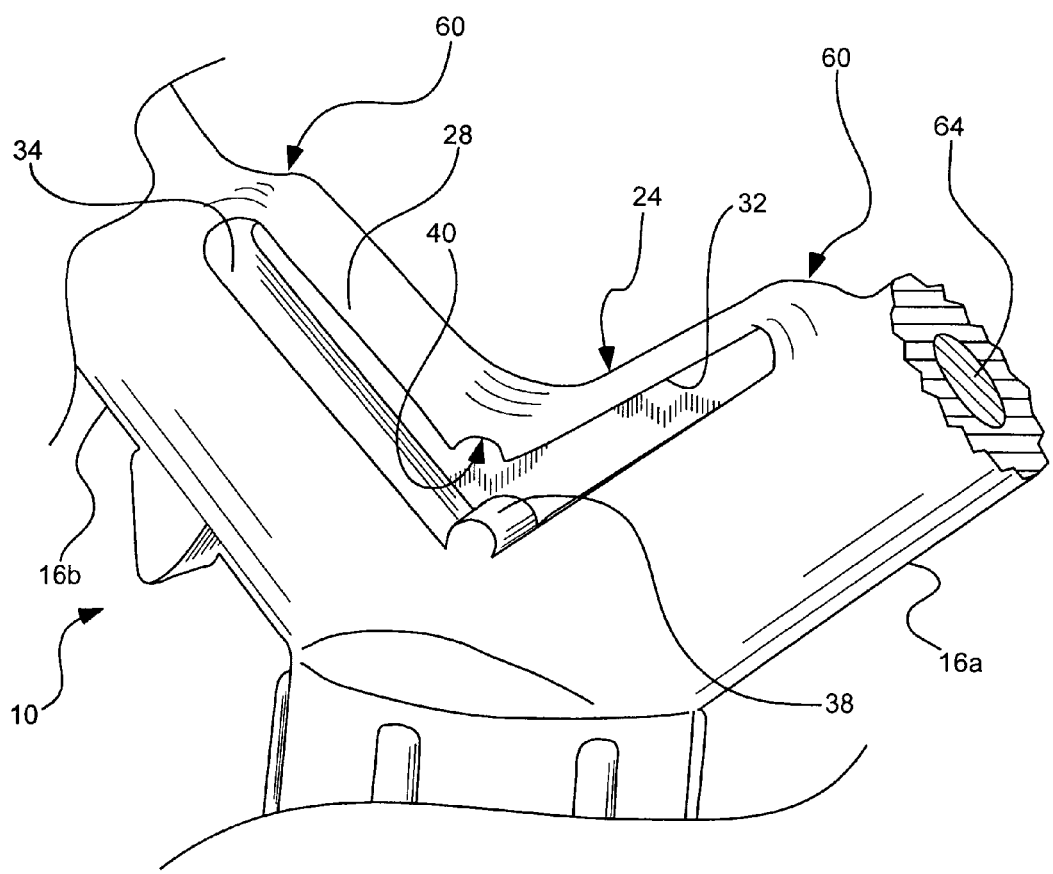
FIG. 3 is a more detailed, perspective view of the cushioned holder of FIG. 1.

As mostly clearly shown in FIGS. 1 and 3, in one embodiment of the invention cushion 24 can include a cavity 30 formed therein which can include a lower protrusion 38 and an upper indentation 40. The lower protrusion can be configured to nest within the upper indentation to provide a secondary cushion in the event the cavity closes, or nearly closes, upon itself. Thus, in this embodiment, in the event the upper contact surface 32 is stretched to the point of resting upon, or nearly resting upon, the lower contact surface 34, the lower protrusion and upper indentation can mate together to support the upper, raised portion of the cushion. In this manner, the protrusion and the indentation can assuming the loading of the cushion before the upper and lower contact surfaces become completely flush with one another. The protrusion and indentation can thus serve as a secondary, or redundant, cushioning interface.

By forming the cavity 30 within the cushion divided or bifurcated by the riser 36, the cushion of the present invention can provide a sufficiently pliant interface between the article being held and the holder, while also being able to withstand loads from articles which would otherwise tend to move the upper portion of the cushion in a lateral motion (e.g., backward-to-forward motion relative to the arms of the holder).

Intermediate riser 36 thus provides vertical support between the upper portion of the cushion and the lower contact surface, while at the same time providing lateral support to the upper portion to limit backward and forward movement of the upper portion (with respect to the holder). By limiting (but not necessarily eliminating) this motion, the integrity of the entire cushion can be maintained and the life cycle of the cushioned holder can be extended greatly. In addition to extending the life of the cushion, the vertical cushion with the intermediate riser allows objects to be held much more stationary than cushioning systems which allow lateral movement of the article being held within the holders.

Figure 4:
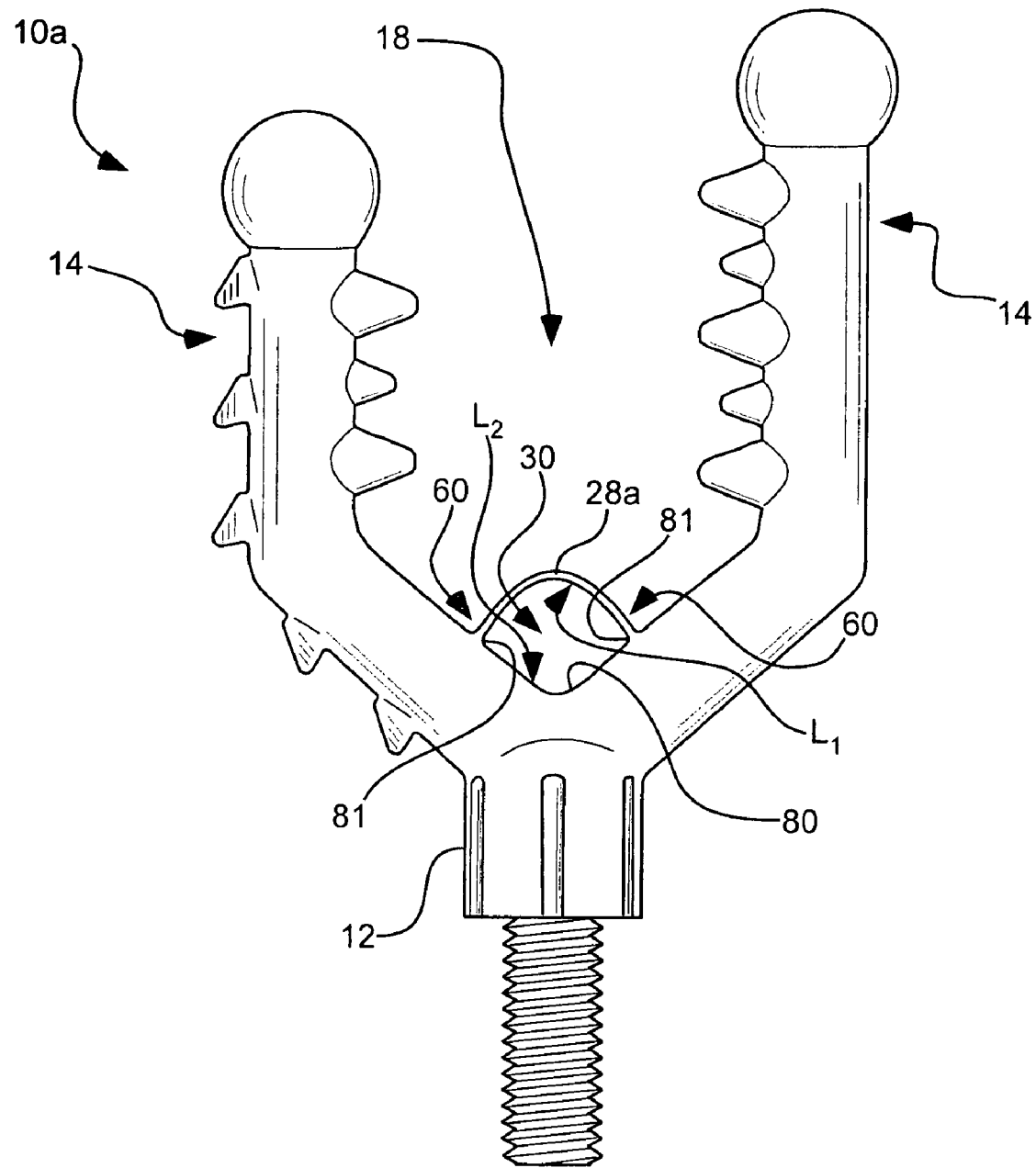
FIG. 4 is a front view of a cushioned article holder in accordance with another embodiment of the invention.

In accordance with another aspect of the invention, embodiments of which are shown in FIGS. 1 and 4, the cushion 24 can include an elongate raised portion that extends from lower portions of the upright arms into the containment area 18. In this embodiment, the elongate raised portion can include an upper strap 28, 28a that extends upwardly from the lower portions of each of the upright arms to provide a strain relief section 60 to the upper strap to enable the upper strap to stretch without tending to pull the elongate raised portion from the lower portions of each of the upright arms. In many conventional article cushioning systems, the upper strap, which is deformed downwardly in response to the load applied by an article, is coupled to upwardly extending arms of the holder along the line at which the strap tends to stretch in response to loading. Thus, when the upper strap is deflected, the strap itself is subject to stretching and the portion of the strap attached to the upright arms tends to apply a separating force on the upright arms. In this manner, the portion of the strap that is perhaps most likely to fail, e.g., the transition point between the strap and the upright arm, is subject to relatively high stress concentrations.

Figure 2:
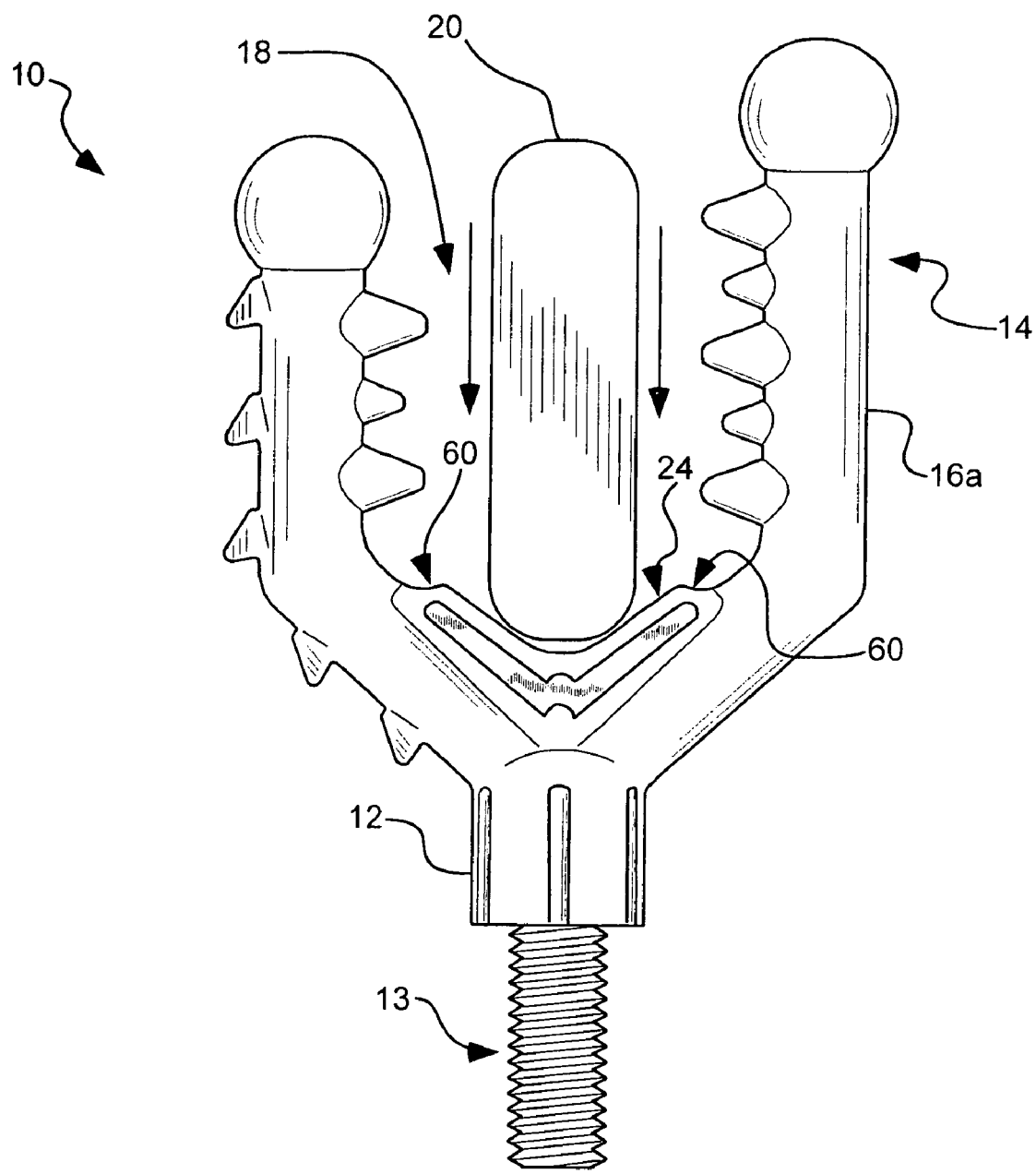
FIG. 2 is a front view of the cushioned holder of FIG. 1 in accordance with the present invention, shown with an article held therein.

In contrast, the upper strap 28, 28a of the present invention is joined to the material of the lower portion of the upright arms 16 in an orientation oblique to the direction of loading in the strap, as shown at 60 in FIGS. 2, 3 and 4. In this manner, when the upper strap is deflected downwardly toward the lower portion of the cushion, the strain relief section 60 either bends only slightly inwardly toward the center of the containment area, or is actually pushed outwardly from the containment area, depending upon the geometry and weight of the article being held. Thus, under very few or no loading conditions does the section 60 tend to pull away from the lower portion of the arms 16, or to apply a separating force to the lower portions of the arms. In this manner, the strain relief section 60, which might otherwise be subject to the highest stress concentrations experienced in the cushion, becomes a relatively low stress concentration area.

As illustrated by example in FIG. 4, in one embodiment of the invention, the upper strap 28a can extend inwardly from one of the upright arms toward an opposing upright arm and across a portion of the containment area 18 to another of the upright arms. A lower contact portion 80 can be defined on the upright arms between ends 81 of the upper strap. The upper strap can have a perimeter length $L_1$ that is greater than or equal to a perimeter length $L_2$ of the lower contact portion. In this manner, as the upper strap is deflected downwardly, the upper strap is never stretched to the point where stress relief sections 60 are subject to a force that tends to separate the stress relief sections from the upright arms. Instead, the ends of the upper strap are either compressed into the upright arms, or merely fold over slightly as the strap is extended downwardly.

In the cross-sectioned view of FIGS. 1A and 1A' (and in sectioned view in FIG. 3) a stiffening member 64 is shown which can include a relatively stiff metallic, composite or polymeric material which is sufficiently stiff to limit bending of the holder and the upright arms. In this aspect of the invention, the uprights arms are substantially rigid and sufficiently robust so as to not be subject to bending or flexing. In the embodiment shown, the stiffener is formed with a circular cross section. However, it is to be understood that the stiffener can be formed in a variety of cross sectional shapes, including oval, square, rectangular, etc. While the stiffener can be formed from a variety of materials, in one aspect it is formed of cold rolled steel rod.

The stiffener can generally be surrounded by a uniform thickness of pliant material which can also form the cushions, gripping teeth, catches, etc. Thus, in this embodiment of the invention, the cushion is formed as an integral part of the outer material of the holder. It is to be understood, however, that the cushion can be formed from a material different than the material covering a majority of the holder, and can be coupled to the holder material rather than being formed integrally with the holder material. In one aspect of the invention, the pliant material is a thermoplastic elastomer such as the product sold under the trade name SANTOPRENE with a Shore-A hardness of about 65.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

We claim:

1. A cushioned holder device for holding articles, comprising:
   an attachment base, configured to be attached to a support structure;
   a holding member configured to receive and hold an article therein, the holding member being coupled to the attachment base and including two generally upright arms which collectively define a containment area therebetween; and
   a cushion, associated with the holder at a lower portion of the containment area to provide a cushioned interface between the article and the holder, the cushion including:
      an upper contact surface having one of: an indentation formed therein and a protrusion extending therefrom; and
      an opposing lower contact surface having one of: an indentation formed therein and a protrusion extending therefrom;
      the indentation and the protrusion being operable to provide a secondary cushioning interface to the article holder in the event the upper and lower contact surfaces of the cushion are nearly fully compressed together.

2. The device of claim 1, further comprising an intermediate riser extending between the upper contact surface and the lower contact surface.

3. The device of claim 2, wherein the upper contact surface and the lower contact surface each include contact planes that extend substantially orthogonally to a plane defined by the upright arms.

4. The device of claim 3, wherein the intermediate riser extends in a plane orthogonal to the contact planes of the upper and lower contact surfaces.

5. The device of claim 2, wherein the intermediate riser is coupled across substantially a full width of the upper contact surface and substantially a full width of the lower contact surface.

6. The device of claim 1, wherein the upright arms are substantially rigid.

7. The device of claim 1, wherein the indentation and the protrusion are arcuately shaped.

* * * * *